(12) United States Patent
Aiyer et al.

(10) Patent No.: US 11,995,444 B2
(45) Date of Patent: *May 28, 2024

(54) SYSTEMS AND METHODS FOR MODERNIZING LEGACY APPLICATIONS

(71) Applicant: appsFreedom, Inc., Chandler, AZ (US)

(72) Inventors: Vaidyanathan Aiyer, Chandler, AZ (US); Vikas Gupta, Naperville, IL (US); Kapil Bhamburkar, Monroe Township, NJ (US); Seetha Ramprasad Naralasetty, Chandler, AZ (US); Manoj Kumar Duraisamy, Chandler, AZ (US)

(73) Assignee: APPSFREEDOM, INC., Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/305,682

(22) Filed: Apr. 24, 2023

(65) Prior Publication Data

US 2023/0266970 A1 Aug. 24, 2023

Related U.S. Application Data

(63) Continuation of application No. 17/496,224, filed on Oct. 7, 2021, now Pat. No. 11,669,332.

(60) Provisional application No. 63/088,666, filed on Oct. 7, 2020.

(51) Int. Cl.
| | | |
|---|---|---|
| *G06F 9/38* | (2018.01) | |
| *G06F 8/75* | (2018.01) | |
| *G06F 8/76* | (2018.01) | |
| *G06F 9/30* | (2018.01) | |
| *G06F 16/907* | (2019.01) | |
| *G06N 3/02* | (2006.01) | |

(52) U.S. Cl.
CPC .............. *G06F 9/3838* (2013.01); *G06F 8/75* (2013.01); *G06F 8/76* (2013.01); *G06F 9/3005* (2013.01); *G06F 16/907* (2019.01); *G06N 3/02* (2013.01)

(58) Field of Classification Search
CPC .... G06F 9/3838; G06F 9/3005; G06F 16/907; G06F 8/75; G06F 8/76; G06N 3/02
See application file for complete search history.

(56) References Cited

U.S. PATENT DOCUMENTS

| | | | | |
|---|---|---|---|---|
| 10,699,212 | B2* | 6/2020 | Pistoia | ................... G06F 21/566 |
| 2010/0246981 | A1* | 9/2010 | Hu | ......................... G16H 30/40 |
| | | | | 705/2 |
| 2014/0035945 | A1* | 2/2014 | Anglin | ...................... G06F 3/14 |
| | | | | 345/619 |
| 2016/0062753 | A1* | 3/2016 | Champagne | .............. G06F 8/51 |
| | | | | 717/137 |
| 2021/0382725 | A1* | 12/2021 | Vemula | ................ G06F 9/4494 |
| 2023/0266970 | A1* | 8/2023 | Aiyer | ...................... G06F 8/447 |
| | | | | 712/216 |

* cited by examiner

*Primary Examiner* — Wei Y Zhen
*Assistant Examiner* — Amir Soltanzadeh
(74) *Attorney, Agent, or Firm* — Goodwin Procter LLP

(57) ABSTRACT

Methods and supporting systems are disclosed herein that when applied to enterprise applications built on various enterprise application development platforms are translated from the high-level platform-specific language into applications programmed using low-code objects that are deployable as edge-ready, cloud-based applications.

18 Claims, 8 Drawing Sheets

| Search | Type ∨ | Module ∨ | Action ∨ | Usage ⇕ | Objects ⇕ | Cost ⇕ | More information |
|---|---|---|---|---|---|---|---|
| ZBOM_CREATE | | | | | | | Modernization [Barcode scanner] [Something] [+] type |
| Create BOM items tr. CAD Spreadsheet | T Code | HR ∨ | Modernize ∨ | ▬▬ 3 | - | ∨ | |
| 2002 Create BOM items tr. CAD Spreadsheet | T Code | HR ∨ | ✓Modernized ∨ | ▬▬▬ 3 | - | ∨ | IT backlog (11 teams) View all |
| 2003 Create BOM items tr. CAD Spreadsheet | T Code | HR ∨ | Modernize ∨ | ▬▬ 3 | o $35.000 ⟩ | ∨ | Program ⟩ Z_CREATE_MATERIAL_BOM_ITEMS Program Z_CREATE_MATERIAL_BOM_ITEMS |
| 2003 Create BOM items tr. CAD Spreadsheet | T Code | HR ∨ | Modernize ∨ | ▬▬ 3 | - | ∨ | ⟩ Z_CREATE_MATERIAL_BOM_ITEMS Program Z_CREATE_MATERIAL_BOM_ITEMS |
| 2003 Create BOM items tr. CAD Spreadsheet | T Code | HR ∨ | Modernize ∨ | ▬▬ 3 | - | ∨ | ⟩ Z_CREATE_MATERIAL_BOM_ITEMS Program Z_CREATE_MATERIAL_BOM_ITEMS |
| 2003 Create BOM items tr. CAD Spreadsheet | T Code | HR ∨ | Modernize ∨ | ▬▬ 3 | - | ∨ | ⟩ Z_CREATE_MATERIAL_BOM_ITEMS Program Z_CREATE_MATERIAL_BOM_ITEMS |
| 2003 Create BOM items tr. CAD Spreadsheet | T Code | HR ∨ | Modernize ∨ | ▬▬ 3 | - | ∨ | ⟩ Z_CREATE_MATERIAL_BOM_ITEMS Program Z_CREATE_MATERIAL_BOM_ITEMS |
| 2003 Create BOM items tr. CAD Spreadsheet | T Code | HR ∨ | Modernize ∨ | ▬▬ 3 | - | ∨ | ⟩ Z_CREATE_MATERIAL_BOM_ITEMS Program Z_CREATE_MATERIAL_BOM_ITEMS |
| 2003 Create BOM items tr. CAD Spreadsheet | T Code | HR ∨ | Modernize ∨ | ▬▬ 3 | - | ∨ | ⟩ Z_CREATE_MATERIAL_BOM_ITEMS Program Z_CREATE_MATERIAL_BOM_ITEMS |
| 2003 | T Code | HR ∨ | Modernize ∨ | ▬▬ 3 | | | |

Figure 4

| Home | Database | Drive | Tasks | Settings | | | ⊞ Tables | | ✕ Query | |
|---|---|---|---|---|---|---|---|---|---|---|
| Tables | | | | ID | ▼T Task | ⊟ User | | ▭ Date | | ∷ Duration |
| Table name | ⋮ | | | 1 | Task name | Ricardo | | 21/01/2019 | | 360 |
| Tasks | ⋮ | | | 2 | Task name | Ricardo | | 21/01/2019 | | 360 |
| Table name | ⋮ | | | 3 | Task name | Ricardo | | 21/01/2019 | | 360 |
| Table name | ⋮ | | | 4 | Task name | Ricardo | | 21/01/2019 | | 360 |
| Table name | ⋮ | | | 5 | Task name | Ricardo | | 21/01/2019 | | 360 |
| Table name | ⋮ | | | 6 | Task name | Ricardo | | 21/01/2019 | | 360 |
| Table name | ⋮ | | | 7 | Task name | Ricardo | | 21/01/2019 | | 360 |
| Table name | ⋮ | | | 8 | Task name | Ricardo | | 21/01/2019 | | 360 |
| Table name | ⋮ | | | 9 | Task name | Ricardo | | 21/01/2019 | | 360 |
| Table name | ⋮ | | | 10 | Task name | Ricardo | | 21/01/2019 | | 360 |

Figure 8

SYSTEMS AND METHODS FOR MODERNIZING LEGACY APPLICATIONS

CROSS REFERENCE TO RELATED APPLICATIONS

This application is a continuation of U.S. patent application Ser. No. 17/496,224, filed on Oct. 7, 2021, which claims the benefit of and priority to U.S. Provisional Application Ser. No. 63/088,666 filed on Oct. 7, 2020, the entire disclosures of which are incorporated by reference herein.

TECHNICAL FIELD

The invention relates generally to automated application development, and, more specifically, the automated analysis of legacy applications and generation of modern, Cloud-based Software-as-a-Service application code running on browsers, mobile and other relevant edge devices to replace or supplement the legacy applications.

BACKGROUND

In today's post pandemic world, all CIO's are struggling with the complexity and costs of delivering IT services to remote workforces. The enterprise IT environment has become very complex and becoming more everyday with newer cloud-based technologies and core business-specific applications built on underlying application platforms such as SAP, SalesForce, Oracle and others. Many of the applications built on these platforms are legacy applications with increasing costs of operation and maintenance, based in part on years of customization.

Historically, the only option these enterprises had to reduce IT complexity was to throw away legacy investment and start afresh using new tools and technology. The redesign/rebuild of these legacy applications into new, modern applications takes an enormous amount of time, effort and budget.

SUMMARY OF THE INVENTION

To address the challenges of programmatically identifying and converting these legacy applications, embodiments of the invention provide an enterprise-grade platform for legacy diagnosis, Convert, build, deploy and run mission critical enterprise applications and easily integrate with legacy applications. In addition, methods and supporting systems are provided that use low-code/no-code techniques to rapidly build and deploy corresponding applications on any edge-based device on a modern architecture.

In certain particular embodiments, the methods are applied to enterprise applications built on the SAP platform that primarily use Advanced Business Application Programming ("ABAP") language into applications programmed using low-code objects in the EdgeReady Cloud. The system includes a converter/modernizer module to convert the ABAP language to a higher-level abstraction layer (low-code objects) defined using a common set of terms representing ERC objects. Once the ERC objects are created, developers can continue the development process in the ERC platform to build and publish the application. In many cases, the modernizer module diagnoses and discovers "technical debt"—or non-core ABAP customizations that also require conversion into ERC objects, some of which may be novel to a particular application or implementation. These same methods can be applied to other enterprise applications built using proprietary application platforms such as Oracle, SalesForce and others.

In a first aspect, the invention provides a method comprising receiving source code for a platform-dependent application comprising a plurality of application components developed using a platform-dependent programming construct and selecting one or more application components for conversion from the platform-dependent programming construct to a platform agnostic programming construct. For each selected application component, the platform-dependent source code is parsed into functional components and deriving pseudocode and metadata for each functional component and platform-agnostic programming instructions are derived for each selected application component based at least in part on the derived pseudocode and metadata. Processing logic correlating to a data flow and process flow is generated for the platform-dependent application and attributed to steps in the data flow and process flow. User interface objects corresponding to user actions are generated that, when instantiated, executed one or more of the platform-agnostic programming instructions and database objects are created which, when executed, process data queries from the platform-agnostic programming instructions in conjunction with a database. The platform-agnostic programming instructions, user interface objects, database objects, and processing logic are combined into a plurality of platform-agnostic applications, each of the plurality of platform-agnostic applications being deployable on a specific form factor.

In a second aspect, the invention provides a system for receiving source code for a platform-dependent application comprising a plurality of application components developed using a platform-dependent programming construct and selecting one or more application components for conversion from the platform-dependent programming construct to a platform agnostic programming construct. For each selected application component, the platform-dependent source code is parsed into functional components and deriving pseudocode and metadata for each functional component and platform-agnostic programming instructions are derived for each selected application component based at least in part on the derived pseudocode and metadata. Processing logic correlating to a data flow and process flow is generated for the platform-dependent application and attributed to steps in the data flow and process flow. User interface objects corresponding to user actions are generated that, when instantiated, executed one or more of the platform-agnostic programming instructions and database objects are created which, when executed, process data queries from the platform-agnostic programming instructions in conjunction with a database. The platform-agnostic programming instructions, user interface objects, database objects, and processing logic are combined into a plurality of platform-agnostic applications, each of the plurality of platform-agnostic applications being deployable on a specific form factor.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings.

FIG. 4 is a screen illustration showing a listing of application assets that facilitates the selection of certain assets for conversion according to various embodiments of the invention.

FIG. 8 is an exemplary user interface that facilities the review and editing of database definitions and designs for the converted application according to various embodiments of the invention.

DETAILED DESCRIPTION

The methods and supporting systems described herein provide an application architecture and steps that facilitate the conversion of an enterprise level application that may include a client-side use interface, ABAP custom t-code and reports and/or a .NET/Java application to a more modern application for implementation on consumer and rugged mobile devices, within a browser based application and on kiosks, IoT devices, etc. While the specific processes described herein relate to the conversion of applications developed on the SAP platform, the same techniques can be applied to a number of different legacy application architectures, including Oracle, SalesForce and others.

Figure 1:
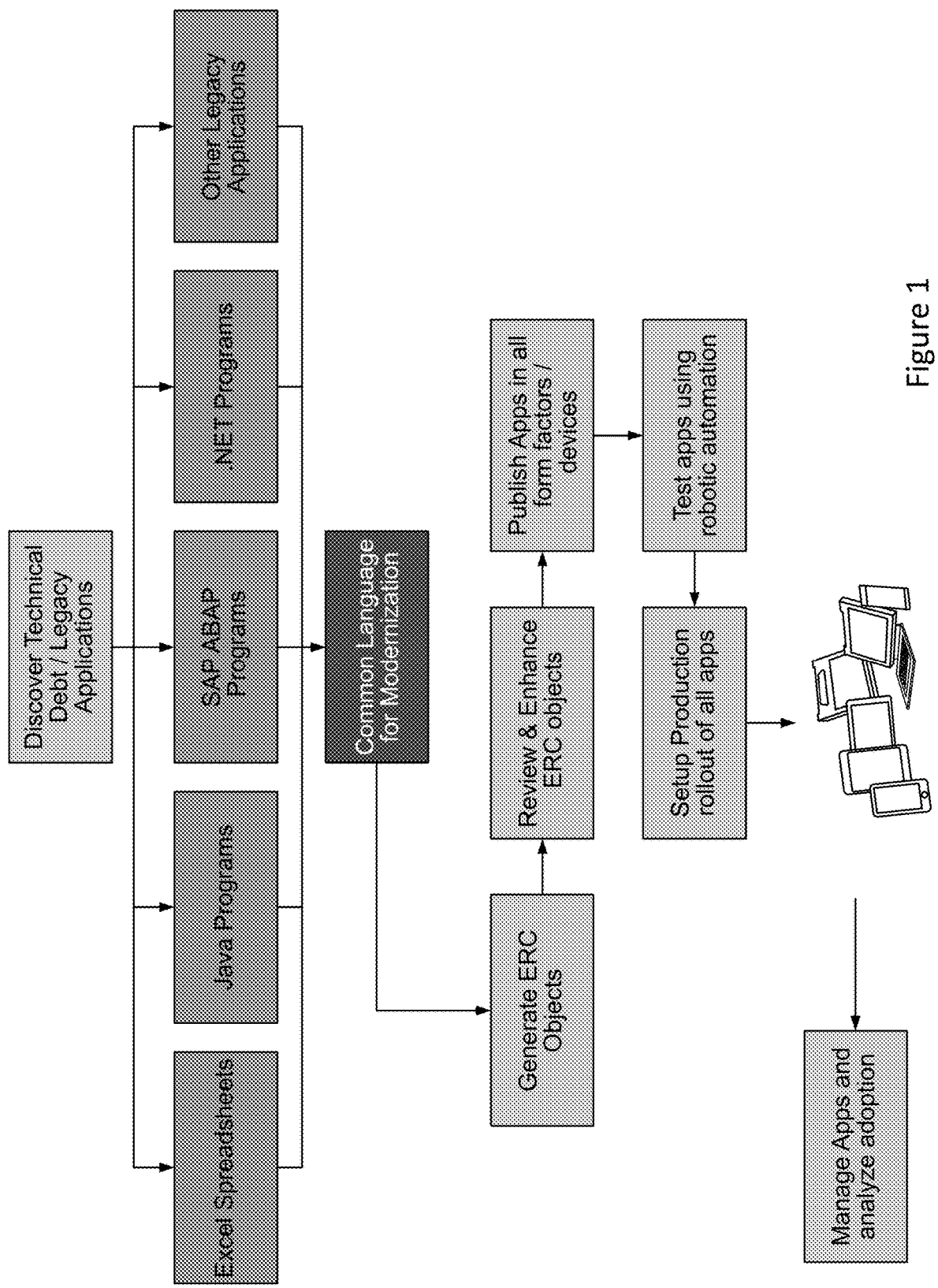
FIG. 1 is a high level workflow illustrating the steps of converting applications according to various embodiments of the invention.

FIG. 1 provides a high level flowchart illustrating one embodiment of the invention for converting a platform-specific legacy application into a deployable, platform independent application. In this instance platform-specific refers to an application that was developed on a proprietary application development platform that must remain on that platform for its operations. Platform-independent refers to an application that is developed in a standard, platform-agnostic language (or languages) such as java, C++, PERL, etc. that permits application developers to review, revise and customize data and logic flows, user interfaces, and data structures without relying on any proprietary application platform.

In FIG. 1, legacy application is identified as a target application and broken down into is functional components by, for example, the application or programming platform used to implement the application, such as Excel, java, platform specific functions, .NET functions and other functions. The application functions are converted into a common language, and application objects are created for each function. The application objects are reviewed and revised by a user, and published for the various form factors and devices that the application will be deployed on. Various testing scripts can be run against the application (either manually or through automated testing scripts) and once adequately tested, the application is deployed for use.

Figure 2:
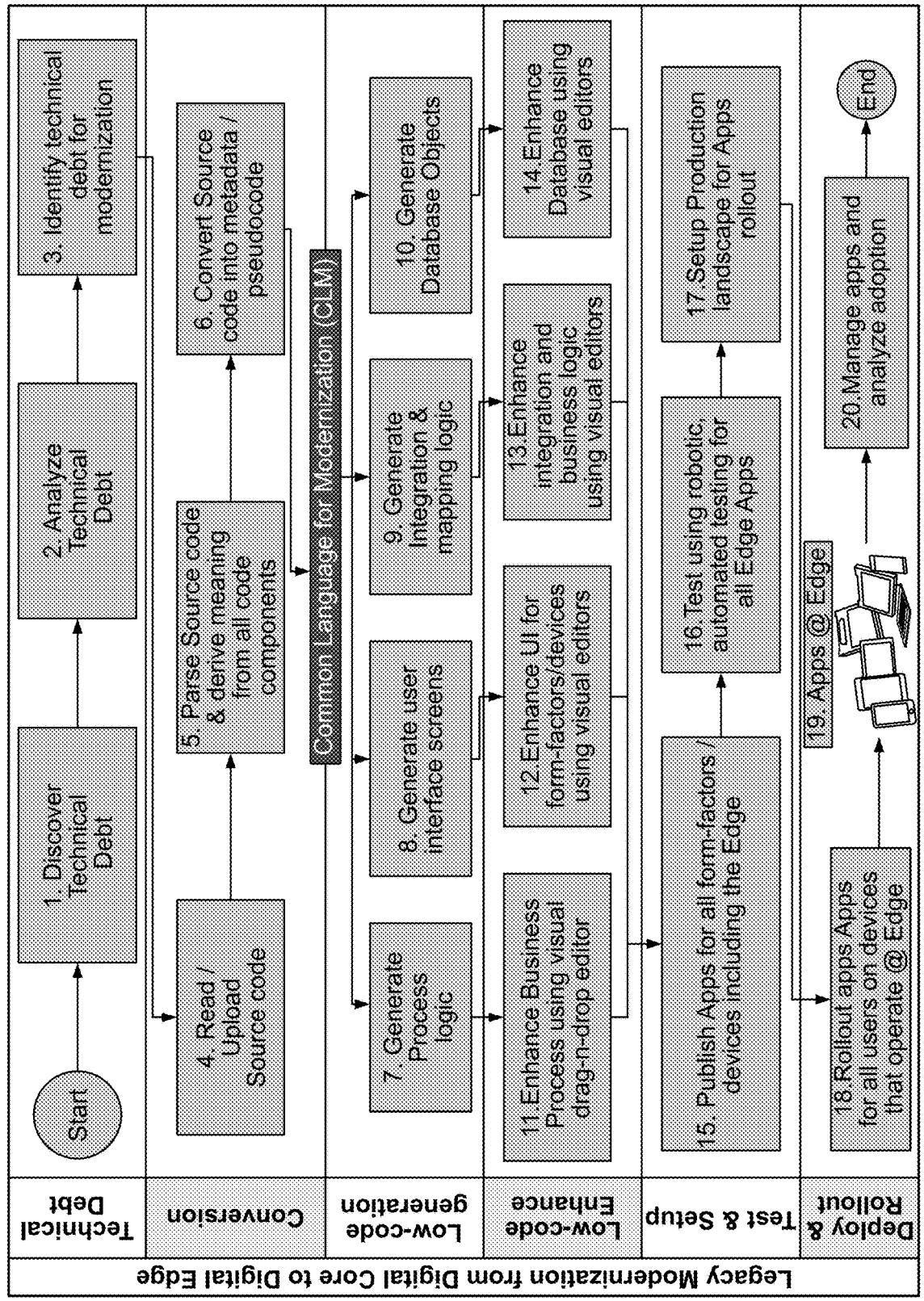
FIG. 2 is a more detailed workflow illustrating the steps of converting applications according to various embodiments of the invention.

FIG. 2 illustrates a more detailed process for converting the legacy application in accordance with various embodiments of the invention. In one particular embodiment, the method may be described as a series of six phases—identification of technical debt, application conversion, low-level code generation, low-level code enhancement, testing and setup, and deployment. Each phase can be further broken down into steps within each phase as further described below.

Phase 1: Technical Debt—In phase 1, the system discovers "technical debt" across the enterprise's IT landscape. Examples of technical debt include, for example, old legacy applications like .NET, Java, Database applications and customizations in ERP's like SAP or Oracle. More specifically, this process includes three steps—discovery, analysis and identification.

Step 1. Technical debt discovery. The legacy operating environment is scanned for existing application assets. The legacy environment may be a landscape with applications (e.g., a development landscape or a virtual machine instance for applications running in it) and/or it may be inside an application (e.g., scanning inside SAP ERP for all custom objects developed and deployed). The results of this scan produces a listing of all the technical debt in a landscape or inside a system.

Step 2. Technical debt analysis. This step analyzes the legacy custom code and produces various environment, code and application metrics. The metrics may include, for example, a total number of legacy objects and custom objects (e.g., programs, utility programs, tables, dependencies between programs, objects reused across programs, scripts, etc.) in the environment, within an application, etc. The metrics may also include a cost of maintaining the legacy code (e.g., program maintenance cost, database cost, migration cost, etc.), a technical debt index (i.e., the percentage of technical debt in the system). These metrics are then presented to the user in a dashboard-like screen (e.g., see FIG. 2 below) to facilitate informed decisions regarding the transformation of the legacy system(s) into modern, edge-ready applications.

Figure 3:
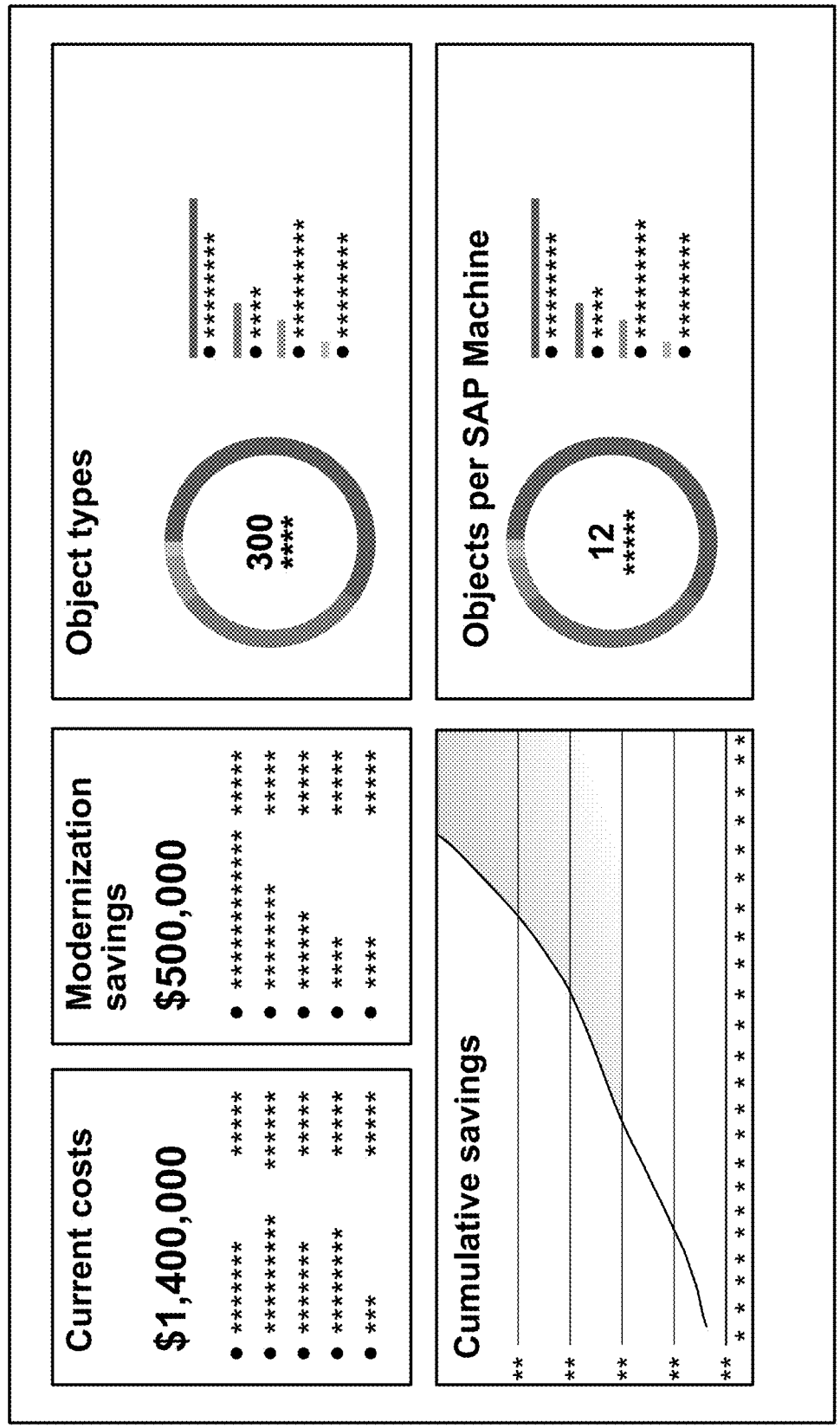
FIG. 3 is an application dashboard illustrating various metrics related to the legacy codebase being converted using the claimed techniques and according to various embodiments of the invention.

FIG. 3 illustrates an exemplary dashboard showing the technical debt associated with an exemplary application. FIG. 4 illustrates a listing of the various assets within the application, allowing the user to identify the degree of usage, costs, and type of component, and select an action (e.g., "modernize") for the component.

Step 3. Technical debt identification for modernization. Using the listing and dashboard produced in Step 2, users can identify and make informed decisions regarding the modernization of technical assets by selecting one or more programs for modernization from an inventory listing as illustrated in FIGS. 3 and 4. For example, an enterprise may not want to modernize all of its applications, or modernize its assets in a phased approach, transforming small batches of applications or individual programs at a time. These selections and decisions are recorded and used in subsequent steps.

Phase 2: Conversion. In Phase 2, the system converts the selected legacy programs and applications into a common language format. This is the first conversion/translation to a normalized form that is independent of the source language of the application being converted. This phase comprises three steps—code read, code parse, and code convert.

Step 4. Read source code. The source code for the legacy application(s) being converted that were identified in the previous step is read into the system either automatically if the system is granted access to the legacy application environment, or, if not then the legacy application code is manually loaded.

Step 5. Parse source code. The system parses the source code, analyzes the programming syntax and identifies any dependent objects. For example, if Program-A calls or links to Program-B and/or a database table, this step identifies those dependencies and prompts the user to either provide access to or manually upload the program for further analysis and parsing. Once all the application components are loaded and deemed complete (e.g., no further dependencies are identified), the code can be converted.

Step 6. Convert source code. The system re-parses the application(s) in order to interpret the programming language syntax. This includes identifying the source application language, database format and any other relevant objects. The application logic is interpreted and expressed as metadata or pseudocode, referred to herein as a Common Language for Modernization ("CLM").

CLM is a common, basic metadata of the application logic/program written in pseudocode. The focus of CLM is to document the application logic in the most basic form without relying on any language-specific syntax to create an application runtime. As such, CLM provides a language-agnostic, common format for use with any application program. More specifically, the CLM process strips down the programming language-specific syntax and logic and writes it into a basic form of application logic, thus avoiding the varied syntax and programming capabilities inherent in different programming languages and development environments. This step is facilitates the overall conversion process by stripping down the language-specific syntax to its most basic form, allowing a modern application to be built based on the CLM metadata and pseudocode.

Phase 3: Low-code generation. In the next phase, the system uses the logic expressed in the CLM (i.e., the pseudocode), and recreates the application in an edge ready, cloud-deployable (ERC) form using various ERC components. This is essentially a "Generation" phase where various objects of an application such as user-interface screens, database objects, and other components are created from the CLM, based on the application need. For example, certain applications may not need user-interface screens or may not need database objects. The generator generates the code only for the application components that are needed.

Step 7. Generate process logic. Here, the business logic and overall application logic is traced and plotted. For example, the logic may represent navigation from one screen to another, or a more complex application logic with various steps and branching logic. This process logic is then visible in a process editor within the system.

Step 8. Generate user interfaces. In this step, all the user-interface screens are generated for the various devices that will be used to access the application, including browser-based UIs, smartphone-UIs and tablet-UIs. The user-interfaces are then visible in the App/UI design tool of the system for review.

Step 9. Generate integration and mapping logic. In this step, all the application logic, business logic and integration logic is created. This includes typical application logics (IF-ELSE, Assignment, LOOP, etc.) as well as integration and mapping logic for integrations with external applications like SAP ERP, Oracle EBS, Databases, etc. This business and integration logic is available within the integration tool of the system.

Step 10. Generate database objects. In this step, all the requisite database tables and views including table relationships are created in the target database which are all visible in the database tool.

In some instances, not all application components may be created for every application. Depending on the application need, in some cases only the necessary or appropriate application components are created. For example, some components or functions of the legacy application may need not be recreated in ERC depending on the complexity of the legacy application. Typically the conversion process addresses between 50% and 100% of the legacy application depending on its complexity, identified redundancies and/or irrelevant or outdated processing steps.

Phase 4: Low-code Enhancement. In phase 4, the developer analyzes the ERC objects and completes and/or enhances the objects with additional capabilities or features depending on business requirements, if necessary.

Figure 5:
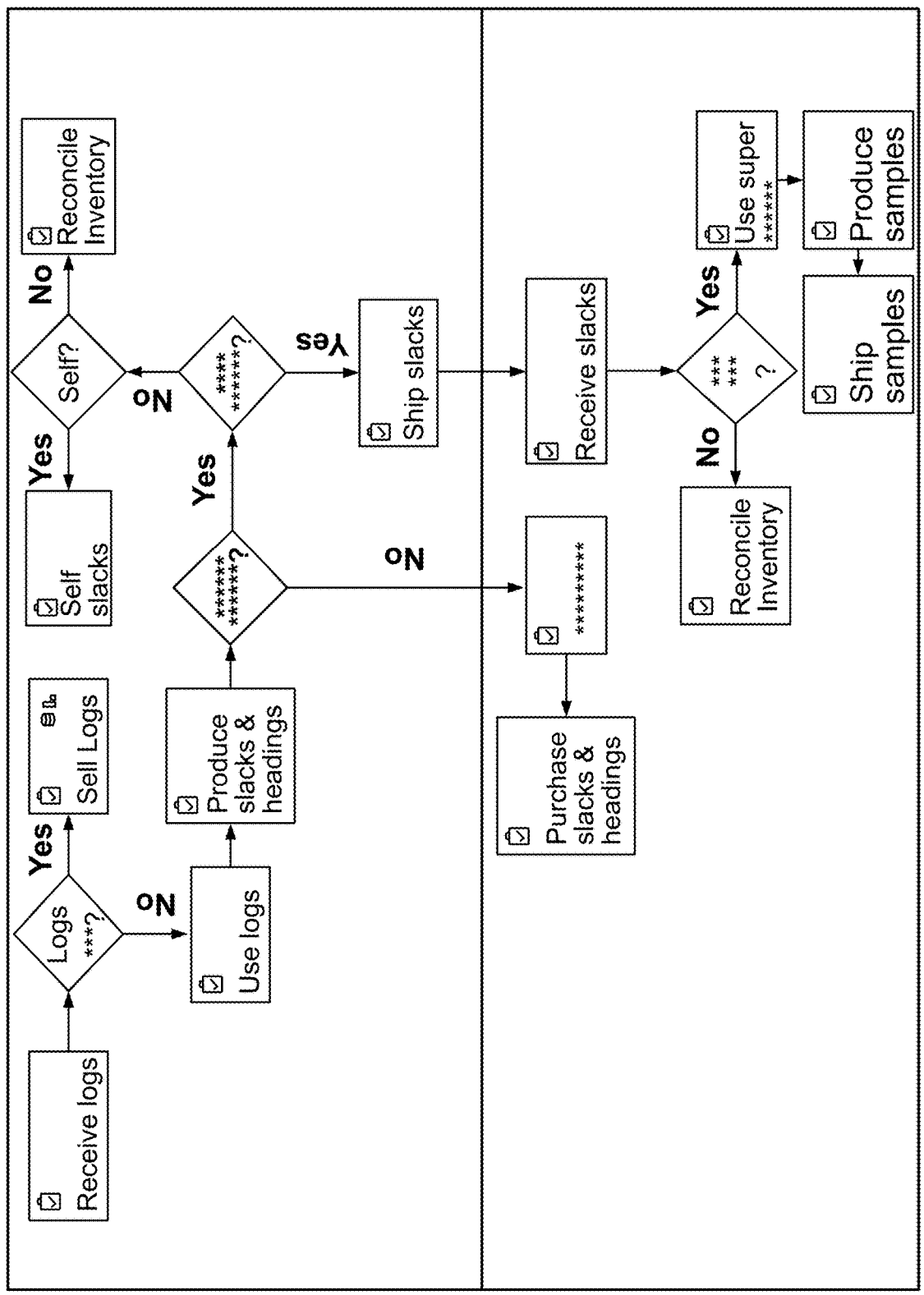
FIG. 5 illustrates the converted application assets and the process and data flows among the application assets according to various embodiments of the invention.

Step 11. Enhance business process. In this step, the developer may review the process flow in the graphical visual process editor and can complete any missing steps, and/or enhances the application process by adding more process steps as deemed necessary. FIG. 5 illustrates an exemplary process flow diagram.

Figure 6:
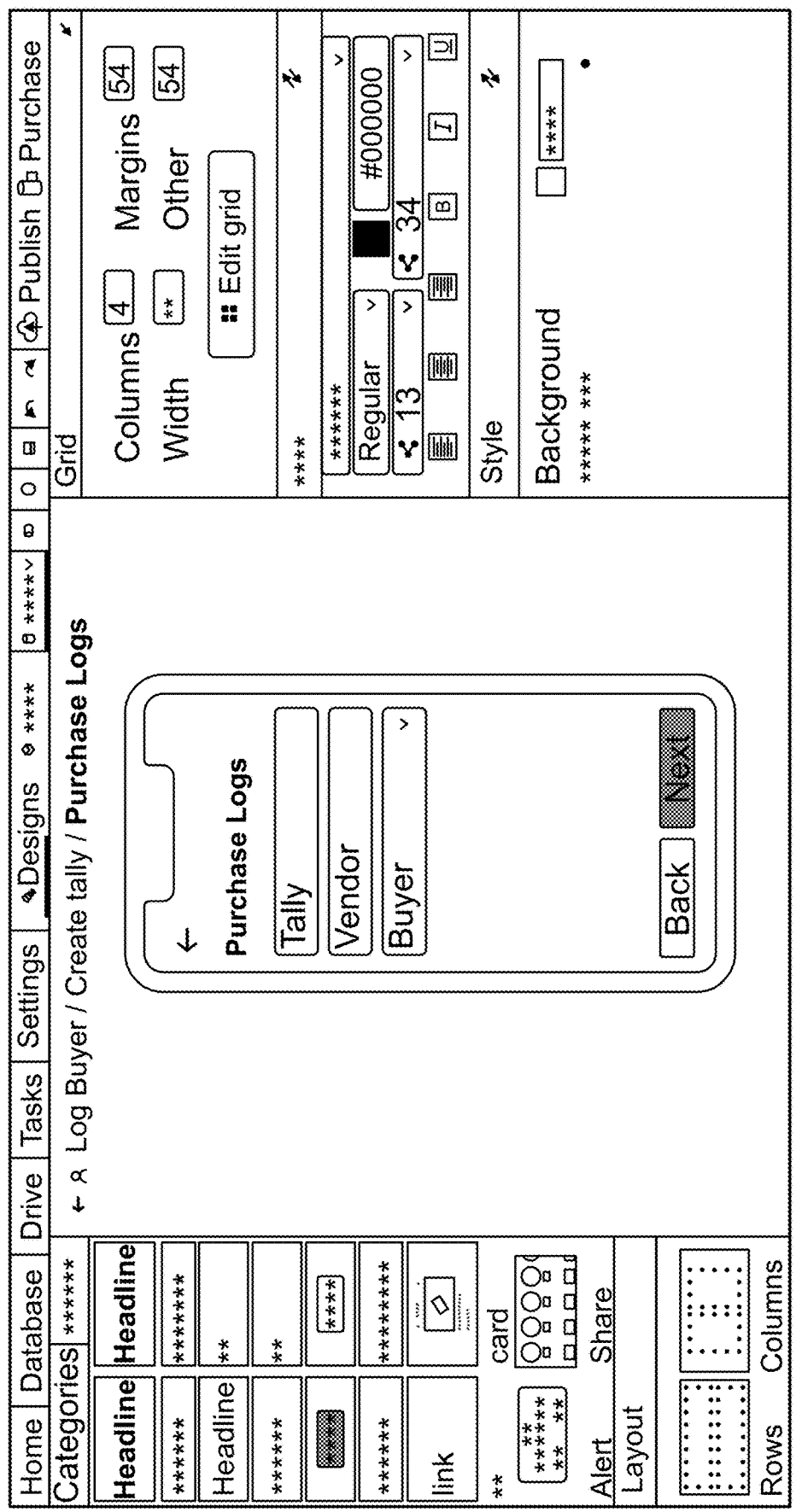
FIG. 6 is a screen capture of a graphical design application screen that facilities the design of a mobile application screen according to various embodiments of the invention.

Step 12. Enhance user interface. In this step, the developer reviews the user-interfaces created for various devices and completes the missing UI components and/or enhances the UI using a graphical design module using visual drag and drop capabilities of the system. FIG. 6 illustrates an exemplary graphical user interface design module in which the developer can review, revise and create graphical components of the application that will correlate to the functions of the legacy application and be consistent with the data and logic flow of the converted application.

Figure 7:
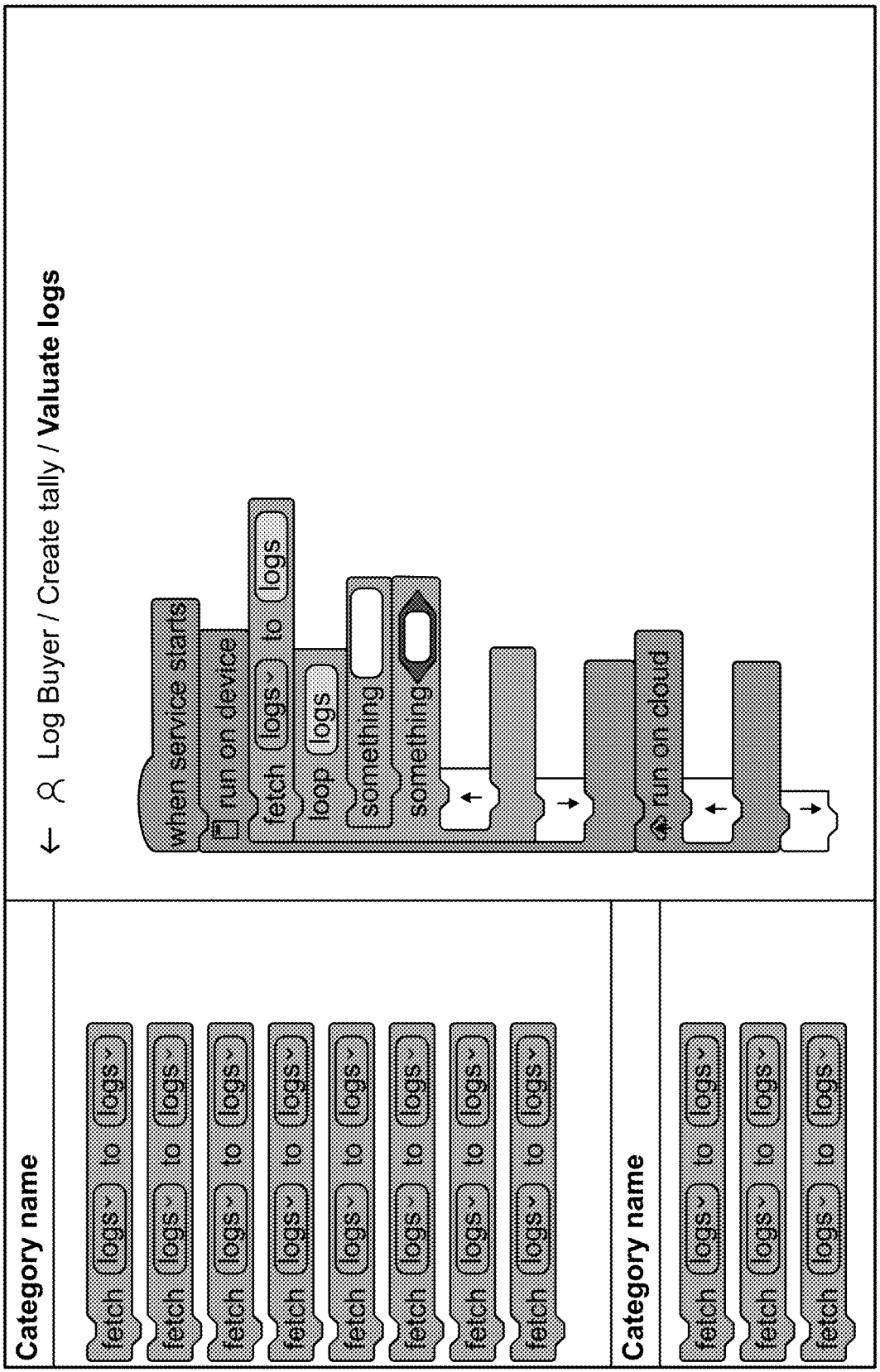
FIG. 7 illustrates the business logic of the converted application in which the user can revise or complete any missing components according to various embodiments of the invention.

Step 13. Enhance Integration and business logic. In this step, the developer reviews the business and integration logic and adds any missing components and/or enhances the logic to address any additional requirements using a graphical logic integration tool, including integration to third-party systems such as SAP, Oracle, Salesforce or other applications. FIG. 7 illustrates one embodiment of a logic integration module.

Step 14. Enhance database. In this step, the developer reviews and completes the database definition and integration as well as any necessary enhancements to implement additional business requirements using the graphical database editor in the system. FIG. 8 illustrates an exemplary database integration review module in which the developer can review the tables, queries and tasks that interact with the underlying database to ensure proper query logic and data definitions.

Phase 5: Test and Setup. In the next phase, the new modernized application is published in various form-factors, tested and setup in a production environment for roll-out to users.

Step 15. Publish applications for the edge using all form factors. As used herein, the "edge" refers to the edge of the business process, where people may be working in remote locations with or potentially without any internet connectivity. In other words, use of an application on the edge indicates allowing users to execute sophisticated capabilities within an application (usually mobile) for extended hours with or without connectivity, with no degradation of user-experience due to a lack of connectivity. In effect, the users has the same user experience whether they are connected or not. In this step, the ERC developer publishes the application on various form-factors, i.e. generating the runtime executables for various devices—from browser applications, consumer mobile apps (iOS, Android, Windows), Industrial/Rugged devices (E.g. Zebra, Honeywell), Kiosks (e.g. Samsung) or IoT devices. The ERC apps are a single source-code but multiple runtime executables that can be executed in any device.

Step 16. Robotic, automated Test. In this step, the applications are tested using robotic automation. The test scripts are recorded using user actions and executed simultaneously on numerous (e.g., hundreds) of devices to ensure the applications include all the necessary features and functionality.

Step 17. Setup production landscape. Once the testing is completed, the application is setup for deployment with user authentications, permissions, authorizations, etc. for an enterprise-wide rollout.

Phase 6: Deploy and Rollout. At this stage, the applications are deployed and rolled out to various users on various devices and managed for the lifecycle of the application.

Step 18. Rollout Applications—In this step, the applications are rolled out to users by making them available on their devices. For mobile devices, applications can automatically be rolled out to their phones based on their corporate policies.

Step 19. Run Applications at the edge on all form factors. In this step, the users login and start using the application. The users can go from one device to another and continue the process inside the application, depending on the configurations. All this user activity is captured and provided back to the system for analysis.

Step 20. Manage and analyze applications. In this step, administrators review the statistics of application usage and manage the lifecycle of the application such as upgrades, retiring the application, revising user permissions when someone leaves the company, etc.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium.

Embodiments of the subject matter, functional operations and processes described in this specification can be implemented in many types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. A computer-implemented method comprising:
   receiving source code for a platform-dependent application comprising a plurality of application components developed using a platform-dependent programming construct;
   selecting one or more application components for conversion from the platform-dependent programming construct to a platform agnostic programming construct;
   parsing the platform-dependent source code into functional components for each selected application component;
   deriving pseudocode and metadata for each functional component parsed from the platform-dependent source code;
   deriving platform-agnostic programming instructions for each selected application component based at least in part on the derived pseudocode and metadata;
   generating processing logic correlating to a data flow and process flow for the platform-dependent application and attributing the generated programming instructions to steps in the data flow and process flow;
   generating a platform-agnostic application based on the platform-agnostic programming instructions and the processing logic;
   generating user interface objects corresponding to user actions that, when instantiated, execute one or more of the platform-agnostic programming instructions, wherein the user interface objects are included in the platform-agnostic application; and
   publishing the platform-agnostic application in a plurality of form factors, wherein each form factor of the plurality of form factors is configured for a specific edge device of a plurality of edge devices.

2. The computer-implemented method of claim 1, wherein a first form factor of the platform-agnostic application includes a first plurality of user interface objects and a second form factor of the platform-agnostic application includes a second plurality of user interface objects, the second plurality of user interface objects including at least one user interface object different from the first plurality of user interface objects.

3. The computer-implemented method of claim 1, further comprising:

generating database objects which, when executed, process data queries from the platform-agnostic programming instructions in conjunction with a database, wherein the database objects are included in the platform-agnostic application.

4. The computer-implemented method of claim 1, further comprising:
deploying a first published form factor of the platform agnostic application on a first edge device, wherein the platform agnostic application is configured to operate locally on the first edge device.

5. The computer-implemented method of claim 4, further comprising:
deploying a first published form factor corresponding to a first portion of the platform agnostic application on a first edge device; and
deploying a second published form factor corresponding to a second portion of the platform agnostic application on a second edge device.

6. The computer-implemented method of claim 5, wherein the first edge device and the second edge device are different types of devices.

7. The computer-implemented method of claim 4, wherein each form factor of the plurality of form factors corresponds to an operating system of a specific edge device of a plurality of edge devices.

8. The computer-implemented method of claim 4, wherein the plurality of form factors includes browser applications and/or mobile applications.

9. The computer-implemented method of claim 4, wherein the plurality of edge devices includes at least one of a mobile phone, a tablet computer, or a laptop computer.

10. A system for generating a platform-agnostic application for distribution across different edge devices, the system comprising:
one or more processors; and
a memory coupled with the one or more processors on which a plurality of modules stored in the memory, that when executed:
receive source code for a platform-dependent application comprising a plurality of application components developed using a platform-dependent programming construct;
select one or more application components for conversion from the platform-dependent programming construct to a platform agnostic programming construct;
parse the platform-dependent source code into functional components for each selected application component;
derive pseudocode and metadata for each functional component parsed from the platform-dependent source code;
derive platform-agnostic programming instructions for each selected application component based at least in part on the derived pseudocode and metadata;
generate processing logic correlating to a data flow and process flow for the platform-dependent application and attributing the generated programming instructions to steps in the data flow and process flow;
generate a platform-agnostic application based on the platform-agnostic programming instructions and the processing logic;
generate user interface objects corresponding to user actions that, when instantiated, execute one or more of the platform-agnostic programming instructions, wherein the user interface objects are included in the platform-agnostic application; and
publish the platform-agnostic application in a plurality of form factors, wherein each form factor of the plurality of form factors is configured for a specific edge device of a plurality of edge devices.

11. The system of claim 10, wherein a first form factor of the platform-agnostic application includes a first plurality of user interface objects and a second form factor of the platform-agnostic application includes a second plurality of user interface objects, the second plurality of user interface objects including at least one user interface object different from the first plurality of user interface objects.

12. The system of claim 10, wherein the plurality of modules, when executed:
generate database objects which, when executed, process data queries from the platform-agnostic programming instructions in conjunction with a database, wherein the database objects are included in the platform-agnostic application.

13. The system of claim 10, wherein the plurality of modules, when executed:
deploy a first published form factor of the platform agnostic application on a first edge device, wherein the platform agnostic application is configured to operate locally on the first edge device.

14. The system of claim 10, wherein the plurality of modules, when executed:
deploy a first published form factor corresponding to a first portion of the platform agnostic application on a first edge device; and
deploy a second published form factor corresponding to a second portion of the platform agnostic application on a second edge device.

15. The system of claim 14, wherein the first edge device and the second edge device are different types of devices.

16. The system of claim 10, wherein each form factor of the plurality of form factors corresponds to an operating system of a specific edge device of a plurality of edge devices.

17. The system of claim 10, wherein the plurality of form factors includes browser applications and/or mobile applications.

18. The system of claim 10, wherein the plurality of edge devices includes at least one of a mobile phone, a tablet computer, or a laptop computer.

* * * * *